Inventors:
Waldemar Witte
Alois Langer

United States Patent Office 3,013,198
Patented Dec. 12, 1961

3,013,198
CELL UNIT FOR INSERTION INTO
A FLASHLIGHT
Waldemar Witte, Steinbergerstrasse 2, and Alois Langer, Mozartstrasse 20, both of Murrhardt, Germany
Continuation of abandoned application Ser. No. 682,182, Sept. 5, 1957. This application Nov. 27, 1959, Ser. No. 855,912
5 Claims. (Cl. 320—2)

This application is a continuation of our application Serial No. 682,182, now abandoned.

This invention relates to rechargeable cell units or inserts for flashlights or the like.

By way of definition, the term "cell unit" or "cell insert" is intended to designate a composite article which is provided with positive and negative terminals on its exterior and with a power source proper in its interior and is shaped in the manner of conventional primary cells for insertion into the body of a flashlight to provide power for the light bulb thereof.

One type of flashlight which has recently become known has a housing in which is accommodated a storage battery serving to energize the light source, together with a charging system or circuit for the battery and prongs for insertion into a power line socket. The charging system is generally so arranged that there is provided a capacitor connected in series with a resistor which function as a voltage divider for reducing the line voltage to the value required for the charging operation, the charging voltage to be applied to the charging dry rectifier being taken off across the aforesaid resistor. In a refinement of this flashlight, the charging system is improved by a control arrangement in which the voltage divider, which may comprise both active and reactive or wattless resistances, includes in lieu of the ohmic tapping resistor an additional dry rectifier which is connected into the circuit with its polarity opposite to that of the charging rectifier connected in parallel therewith. In this manner, the charging rectifier is protected against suddenly occurring voltage peaks.

It has now become evident that such a charging system can advantageously be disposed in a flashlight cell insert or unit which is provided with a secondary cell, preferably a small storage battery.

Small storage batteries to be inserted into the body of a flashlight are known, but when being recharged these must usually be connected to a separate charging device forming no part of the flashlight or any of its components.

The principal object of the present invention is, thus, the provision of a flashlight cell unit or insert comprising a casing equipped with conventionally constructed low voltage output terminals and accommodating a rechargeable secondary cell or battery, preferably a small storage battery, together with a charging circuit connected thereto.

Another object of the present invention is the provision of such a flashlight cell unit which is characterized by the fact that together with the rechargeable secondary battery and the charging system or circuit there are provided in the cell unit casing means facilitating connection of the charging system to a supply voltage main or line without necessitating removal of the charging system or storage battery from the casing.

A related object of the invention is, therefore, the provision of means enabling a flashlight cell unit of the aforesaid type to be easily connected to any common house socket upon being removed from the body of the flashlight which it powers, for the purpose of charging the storage battery. Advantageously, there are provided for this purpose connecting means which are so constructed that during the normal operating condition of the cell unit they are located interiorly of the casing or housing thereof, while for connection to the current supply network or line during the charging operation they are rendered accessible either by being protracted from the housing or by being shifted away and separated from at least one portion of said housing.

An especially advantageous and efficacious structure according to the foregoing is attained when the line connecting means of the unit are constructed in the form of two displaceable electric plug-like prongs which can be slid jointly to project out of the casing or housing for use during the charging operation.

It is still another object of the present invention to provide means ensuring absolute safety of any person using or manipulating the flashlight cell unit during a charging operation. To this end, the cell unit houses suitable control of switch means which automatically effect electric disconnection of the exposed low voltage output terminals of the unit from the charging circuit and from the secondary battery whenever the line connecting means are exposed. In this manner, all danger of shocks due to contacting any electrically conductive part of the unit is eliminated since the casing thereof may be constructed of insulating material or may be otherwise insulated from the voltage- and current-conducting inner parts.

A further object of the present invention is to provide a suitable construction of the voltage divider of the charging system to thereby ensure that even at the highest possible line voltages which may be encountered, no excessively high charging current can be generated. A line voltage change, which may require the use of a transformer, is thus rendered unnecessary and is effectively replaced by recharging periods of different durations.

It is a still further object of the present invention to provide a pocket flashlight cell unit of the aforesaid type which is compactly and sturdily built so as to withstand shocks and other detrimental influences resulting from continued use and handling over long periods of time, and which is both easy and inexpensive to manufacture and service.

These and other objects and advantages of the present invention will become more fully evident from the following detailed description when taken in conjunction with the accompanying drawings, in which.

Figures 1, 2:
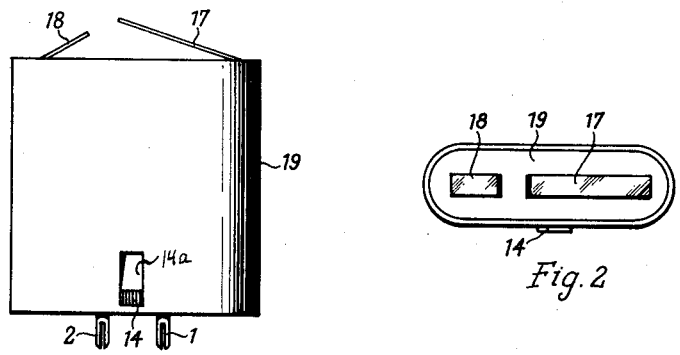
FIG. 1 is a side elevational view of a flashlight cell unit or insert constructed according to the present invention and showing the line connecting, electric plug-like prongs in protracted position.
FIG. 2 is a top plan view of the unit shown in FIG. 1.
Figure 3:
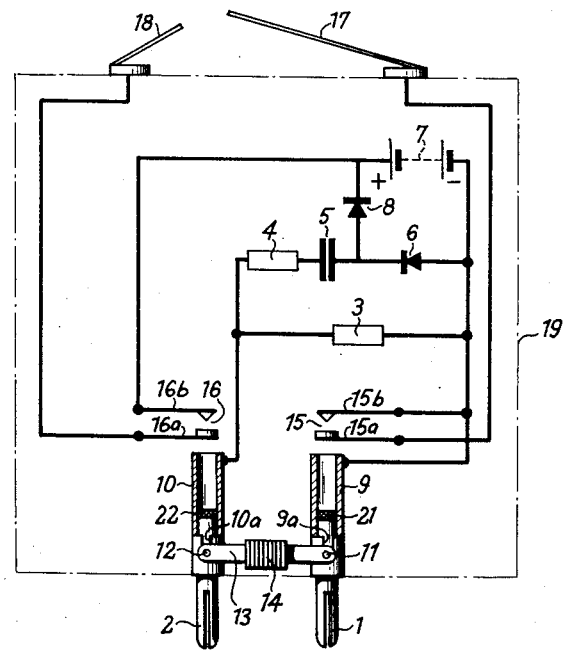
FIG. 3 is a circuit diagram of the control and switching arrangement for the charging system, the prongs being shown in protracted position for charging of the storage battery.
Figure 4:
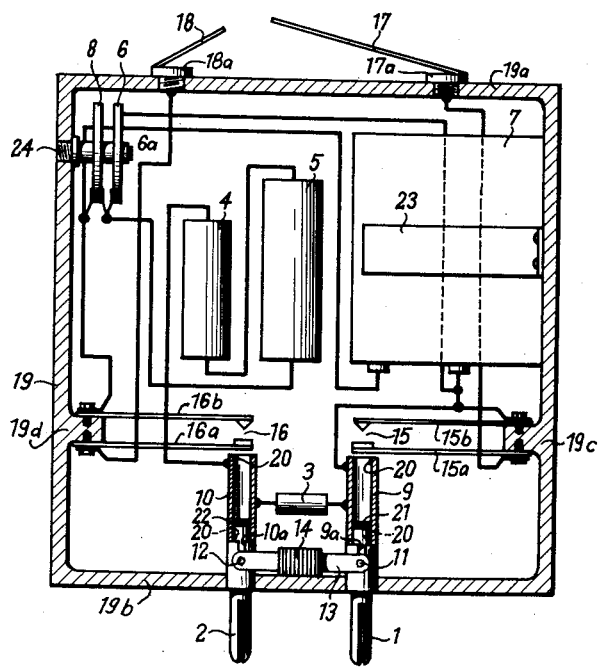
FIG. 4 is a schematic illustration, partly in section, of the interior arrangement of the parts of the flashlight cell unit.

Referring now more particularly to the drawing, it will be seen that the flashlight cell unit according to the invention comprises a housing or casing 19 into the upper end wall 19a of which are screwed two threaded bolts or like members 17a and 18a carrying, respectively, output terminals or like low voltage connecting means constructed in the form of lugs 17 and 18 which, during use of the flashlight, are connected to the negative and positive terminals of a small storage battery 7 also disposed in casing 19 and held in position by a tensioned spring clamp 23. Positioned at and protruding slightly from one side casing through a slot 14a is a slidable knurled gripping member 14 which is connected interiorly of the casing, by means to be more fully described hereinafter, to two electric plug-like prongs 1 and 2 designed for insertion into any standard house line socket (not shown) and slidably arranged in electrically consecutive guide sleeves 9 and 10, respectively, fixed to the bottom end wall 19b of the casing.

The casing 19 also houses a storage battery charging system or circuit which includes a protective resistance 3 connected between sleeves 9 and 10 and thus directly across the prongs 1 and 2. Connected in parallel with the resistance 3 and in series with one another are a current limiting resistor 4, a reactive or wattless resistance in the form of a capacitor 5, and an asymmetrical resistance in the form of a dry rectifier 6, the resistor 4, capacitor 5 and rectifier 6 constituting a voltage divider. The charging voltage to be applied to the small storage battery 7 is taken off across the rectifier 6 via a charging dry rectifier 8 having its output terminal connected to the positive battery terminal and its input terminal to the junction between the capacitor 5 and the output terminal of the rectifier 6 which has its input terminal connected to the negative battery terminal.

The rectifiers 6 and 8, shown in the form of dry plate rectifiers which may be made of selenium or like materials, are mounted on a common carrier 6a provided with a threaded end 24 screwed into a wall of the housing 19. The limiting resistor 4 and the capacitor 5 are mounted and fixed in position within the housing in any suitable manner (not specifically shown).

The sleeves 9 and 10 are provided with elongated, longitudinally extending slots 9a and 10a, respectively. The prongs 1 and 2 are provided with projections 11 and 12 extending through and guided by said slots and connected to the gripping or manipulating member 14 by means of an insulating cross bar 13. Affixed to the inner ends of the prongs 1 and 2 are small plugs or masses 21 and 22 of insulating material, while each of the sleeves 9 and 10 is provided on its inner surface adjacent its opposite ends with two catch members 20 which are arranged to be received in correspondingly shaped recesses (not shown) formed on the prongs 1 and 2 so as to enable immobilization of the latter in their protracted and retracted positions.

Fixedly mounted on brackets 19c and 19d in the casing 19 are two switches 15 and 16 constituted, respectively, by spring contacts 15a, 15b and 16a, 16b of the type employed in conventional relays. The movable ends of the contact springs 15a and 16a are disposed adjacent the inner open ends of the guide sleeves 9 and 10 and are adapted to be displaced so as to close the switches 15 and 16 by the insulating ends 21 and 22 of the prongs 1 and 2 whenever the latter are pushed or retracted into the casing. The low voltage connecting means or output terminals 17 and 18 are connected to the spring contacts 15a and 16a, respectively. The spring contact 15b is connected to sleeve 9 and prong 1 and to the negative pole of the storage battery 7 as well as to one end of the protective resistor 3 and the input terminal of the dry rectifier 6, while the spring contact 16b is connected to the positive terminal of the storage battery and to the output terminal of the charging dry rectifier 8.

The operation of the charging system is as follows:

During normal use of a flashlight when the cell unit is inserted in the body of the flashlight and provides power for the bulb thereof, the prongs 1 and 2 are retracted into the housing 19. The insulating push buttons 21 and 22 formed by the inner prong ends thus close the switches 15 and 16, as a result of which the lugs or terminals 17 and 18 are connected to the opposite terminals of the storage battery 7.

If it is now desired to recharge the cell unit, the housing 19 is removed from the flashlight body and the gripping member 14 pushed along the slot 14a to move the prongs 1 and 2 outwardly of the housing 19. During this movement, the contacts of the switches 15 and 16 are opened, whereby the lugs 17 and 18 are electrically disconnected from the charging system and from all of the control elements accommodated within the housing 19. Upon insertion of the prongs 1 and 2 into any common house line socket, the line voltage is applied to the voltage divider 4—5—6 across the discharge resistor 3. The resistor 4 limits the current flowing in the circuit and thus prevents overloading of the same. By virtue of the fact that an asymmetrical resistance, i.e., the dry rectifier 6, is used in lieu of the conventional ohmic resistance, there is attained a protection of the charging rectifier 8 against high voltage peaks occurring suddenly in the charging circuit. The direct voltage taken off the rectifier 6 is applied through the rectifier 8 to the storage battery 7. Upon completion of the charging operation, which should take at most a few hours, the prongs 1 and 2 are drawn out of the socket and pushed back into the housing 19 by means of the gripping member 14, whereafter the cell unit may be replaced in the flashlight for further use.

It will be readily appreciated that various changes may be made in the cell unit according to the present invention without departing from the scope of the invention as defined in the appended claims. Thus, by way of example, the dry-cell-shaped housing 19 may have different contours than as illustrated herein, while different types of switches may be substituted for the switches 15 and 16.

What is claimed is:

1. A cell unit simulating a flashlight dry cell battery for insertion into a flashlight to provide power for the same, comprising a substantially closed dry-cell-shaped casing, a pair of low voltage output terminals carried by said casing exteriorly thereof, a small storage battery fixedly mounted in and completely enclosed by said casing and having positive and negative terminals electrically connected to said output terminals, respectively, a charging circuit fixedly enclosed within said casing and electrically connected to said storage battery, and connector means mounted in said casing and electrically connected to said charging circuit for connecting the latter to a power line, said charging circuit including capacitive means for reducing the power line voltage to the value needed for charging said storage battery, means defining a path of reciprocal movement for said connector means out of and into said casing, thereby to render said connector means accessible for connection to said power line when moved out of said casing and inaccessible when moved into said casing, switch means for establishing the connection between said output terminals and said storage battery and normally closed upon movement of said connector means into said casing, said switch means being opened upon movement of said connector means out of said casing during a charging operation to automatically disconnect said output terminals electrically from said storage battery, said charging circuit and said connector means.

2. A cell unit according to claim 1, said connector means comprising a pair of prongs rigidly interconnected in the manner of an electric plug to enable insertion of said prongs into any standard electric socket connected to said power line.

3. A cell unit according to claim 2, said path defining means comprising a pair of electrically conductive sleeves each slidably accommodating a respective one of said prongs, said sleeves being open at their opposite ends to enable said prongs to project therefrom both when moved into said casing and when moved out of said casing, said switch means comprising two pairs of relay-type spring contacts with a first contact of each pair positioned adjacent the inner open end of the associated sleeve and in the path of movement of the corresponding one of said prongs for displacement by the latter into engagement with the second contact of the same pair upon movement of said prongs into said casing.

4. A cell unit simulating a flashlight dry cell battery, comprising a substantially closed dry-cell-shaped casing, a pair of low voltage output terminals carried by said casing exteriorly thereof, a storage battery fixedly mounted in and completely enclosed by said casing and having positive and negative terminals, electrical connections between asid positive and negative battery terminals and said output terminals, respectively, a charging circuit fixedly enclosed within said casing and electrically connected to said storage battery, and connector means mounted in said casing and electrically connected to said charging circuit for connecting the latter to a power line, said charging circuit including means for reducing the power line voltage to the value needed for charging said storage battery, said cell unit including movable means for exposing said connector means or enclosing them within said casing, thereby to render said connector means accessible for connection to said power line when extending out of said casing and inaccessible when enclosed within said casing, circuit breaker means in the connections between said output terminals and said storage battery terminals, said circuit breaker means being responsive to said movable means for automatically connecting said storage battery to said output terminals when said connector means are enclosed in said casing.

5. A cell unit simulating a dry-cell battery, comprising a substantially closed dry-cell-shaped casing, a pair of low voltage output terminals carried by said casing exteriorly thereof, a storage battery fixedly mounted in and completely enclosed by said casing and having positive and negative terminals electrically connected to said output terminals, respectively, a charging circuit fixedly enclosed within said casing and electrically connected to said storage battery, and connector means mounted in said casing and electrically connected to said charging circuit for connecting the latter to a power line, said charging circuit including means for rectifying and reducing the power line voltage to the value needed for charging said storage battery, said cell unit including means for exposing said connector means or enclosing them within said casing, thereby to render said connector means accessible for connection to said power line when extending out of said casing and inaccessible when enclosed within said casing, and connecting means located between at least one of said exterior output terminals and said storage battery responsive to said exposing and enclosing means for connecting said storage battery to said one output terminal when said connector means are enclosed in said casing.

References Cited in the file of this patent
UNITED STATES PATENTS

| | | |
|---|---|---|
| 2,642,520 | Coolidge et al. | June 16, 1953 |
| 2,876,410 | Fry | Mar. 3, 1959 |